(12) United States Patent
Vacca et al.

(10) Patent No.: US 10,975,783 B2
(45) Date of Patent: Apr. 13, 2021

(54) CONTROL SYSTEM AND METHOD FOR CONTROLLING EXHAUST GAS EMISSION OF A MOTOR VEHICLE

(71) Applicants: Hyundai Motor Company, Seoul (KR); Kia Motors Corporation, Seoul (KR)

(72) Inventors: Daniele Vacca, Mainz (DE); Raffaele Farina, Wiesbaden (DE)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 2 days.

(21) Appl. No.: 16/532,291

(22) Filed: Aug. 5, 2019

(65) Prior Publication Data
US 2020/0318560 A1    Oct. 8, 2020

(30) Foreign Application Priority Data

Apr. 4, 2019   (DE) ...................... 10 2019 204 810.2

(51) Int. Cl.
*F02D 41/00*   (2006.01)
*F01N 3/18*    (2006.01)
*F01N 11/00*   (2006.01)

(52) U.S. Cl.
CPC ............. *F02D 41/005* (2013.01); *F01N 3/18* (2013.01); *F01N 11/00* (2013.01); *F02D 2200/701* (2013.01)

(58) Field of Classification Search
CPC ....... F01N 11/00; F01N 3/18; F02D 2200/701
See application file for complete search history.

(56) References Cited

U.S. PATENT DOCUMENTS

| | | | | |
|---|---|---|---|---|
| 6,112,151 A | * | 8/2000 | Kruse | F02D 41/2422 180/167 |
| 6,259,986 B1 | * | 7/2001 | Kotwicki | F02D 41/2441 477/113 |
| 6,370,472 B1 | * | 4/2002 | Fosseen | B60K 31/0058 701/102 |
| 6,666,191 B2 | * | 12/2003 | Nakagawa | F02D 31/009 123/480 |
| 6,820,599 B2 | | 11/2004 | Kurtz et al. | |

(Continued)

*Primary Examiner* — Phutthiwat Wongwian
*Assistant Examiner* — Sherman D Manley
(74) *Attorney, Agent, or Firm* — Morgan, Lewis & Bockius LLP

(57) ABSTRACT

A method for controlling exhaust gas emission of a motor vehicle may include determining when the motor vehicle drives into a low-emission zone, wherein the low-emission zone dictates a maximum emission level for the motor vehicle; reducing actual accelerator actuation signals of the motor vehicle to effective accelerator actuation signals within the low-emission zone; and trimming an actual intake temperature of the motor vehicle, being measured with an intake temperature sensor of the motor vehicle, to an effective intake temperature when the actual intake temperature falls outside a predetermined temperature range within the low-emission zone; wherein at least one of the effective accelerator signals and the effective intake temperature are used as inputs for controlling an exhaust gas recirculation (EGR) subsystem of the motor vehicle.

15 Claims, 8 Drawing Sheets

(56) References Cited

U.S. PATENT DOCUMENTS

| | | | |
|---|---|---|---|
| 7,062,371 B2* | 6/2006 | Gault | F02D 41/2422 |
| | | | 701/109 |
| 2006/0064232 A1* | 3/2006 | Ampunan | B60W 40/02 |
| | | | 701/115 |
| 2007/0143007 A1* | 6/2007 | Durand | F02D 19/0618 |
| | | | 701/32.3 |
| 2008/0178576 A1* | 7/2008 | Meier | F01N 13/011 |
| | | | 60/277 |
| 2009/0171547 A1* | 7/2009 | Hyde | F02D 41/021 |
| | | | 701/102 |
| 2009/0171548 A1* | 7/2009 | Hyde | F02D 41/021 |
| | | | 701/102 |
| 2009/0171549 A1* | 7/2009 | Hyde | F01N 9/00 |
| | | | 701/102 |
| 2009/0171555 A1* | 7/2009 | Hyde | F02D 41/021 |
| | | | 701/115 |
| 2012/0078487 A1* | 3/2012 | Light-Holets | F02D 41/0025 |
| | | | 701/102 |

* cited by examiner

CONTROL SYSTEM AND METHOD FOR CONTROLLING EXHAUST GAS EMISSION OF A MOTOR VEHICLE

CROSS-REFERENCE TO RELATED APPLICATION

The present application claims priority to German Patent Application No. 102019204810.2, filed on Apr. 4, 2019, the entire contents of which is incorporated herein for all purposes by this reference.

BACKGROUND OF THE PRESENT INVENTION

Field of the Invention

The present invention relates to a control system and a method for controlling exhaust gas emission of a motor vehicle during operation of an internal combustion engine, in particular of a diesel engine.

Description of Related Art

Many cities and towns around the world operate or prepare so-called low-emission zones, which are defined areas where access by some motor vehicles is restricted or prohibited with the aim of improving the air quality. In particular vehicles with internal combustion engines running on diesel fuel are increasingly regulated depending on local conditions. These vehicles are required to guarantee emission levels for real driving conditions below a certain set level, e.g., emissions of nitrogen oxides, referred to as NOx, below, for example, 250 mg/km.

Exhaust emission control within a vehicle is usually managed by a catalytic converter, which converts toxic gases and pollutants in exhaust gas from the internal combustion engine into less-toxic or non-toxic substances and/or filters such substances from the exhaust gas stream. One approach often used in conjunction with catalytic converters is so-called exhaust gas recirculation (EGR), where NOx emissions are further reduced by recirculating a portion of the exhaust gas back to the engine. During this, the recirculated exhaust gas dilutes oxygen stemming from an incoming air stream, which results in a reduction of peak in-cylinder temperatures and NOx emission.

However, exhaust gas recirculation (EGR) is usually phased down or completely switched off at high engine loads and/or intake temperatures outside a certain operating range, e.g., between ca. 10° C. and 30° C., to protect the engine. As a consequence, NOx emissions increase for these driving conditions.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to improving the performance of exhaust emission control.

According to an aspect of the present invention, a method for controlling exhaust gas emission of a motor vehicle may include determining when the motor vehicle drives into a low-emission zone, wherein the low-emission zone dictates a maximum emission level for the motor vehicle; reducing actual accelerator actuation signals of the motor vehicle to effective accelerator actuation signals within the low-emission zone; and trimming an actual intake temperature of the motor vehicle, being measured with an intake temperature sensor of the motor vehicle, to an effective intake temperature when the actual intake temperature falls outside a predetermined temperature range within the low-emission zone; wherein at least one of the effective accelerator signals and the effective intake temperature is used as inputs for controlling an exhaust gas recirculation (EGR) subsystem of the motor vehicle.

According to another aspect of the present invention, a control system for controlling exhaust gas emission of a motor vehicle may include an exhaust gas recirculation (EGR) subsystem; an intake temperature sensor configured to measure an intake temperature of the motor vehicle; and a control device configured to determine when the motor vehicle drives into a low-emission zone, wherein the low-emission zone dictates a maximum emission level for the motor vehicle, to reduce actual accelerator actuation signals of the motor vehicle to effective accelerator actuation signals within the low-emission zone, to trim an actual intake temperature of the motor vehicle measured with the intake temperature sensor to an effective intake temperature when the actual intake temperature falls outside a predetermined temperature range within the low-emission zone, and to control the EGR subsystem based on at least one of the effective accelerator signals and the effective intake temperature as inputs thereof.

Furthermore, a motor vehicle with a control system according to the present invention is provided.

One idea of the present invention is to reduce emissions of motor vehicles within low-emissions zones, e.g., within a city center, by increasing the operation range and effectiveness of the EGR subsystem. This is achieved by two basic control actions. First, engine power is generally limited within the low-emission zone by reducing accelerator actuation to avoid high engine loads, which could otherwise lead to a reduction in the amount of recirculated exhaust gas within the EGR and thus to a massive increase in NOx emissions. Second, the intake temperature of the motor vehicle, which is normally used as a control temperature for the EGR subsystem, is adjusted for temperature values where the EGR subsystem is normally phased down, e.g., at low and/or high temperatures. Instead of the actual intake temperature, an effective intake temperature is used as input for the EGR control, which means that the EGR may be run in full operation over a larger temperature region. For example, the effective intake temperature may be set to a higher value in case that the real environmental temperature of the vehicle drops below a lower temperature threshold for which the EGR subsystem by default would run on reduced capacity or would be switched off entirely. By resetting, which is trimming, the input temperature for the EGR subsystem, the EGR may be kept running at a higher capacity.

The present invention thus deliberately gives up available engine performance for the time duration that the vehicle stays within the low-emission zone. The underlying idea is that vehicles typically will not need high engine performance within a low-emission zone, in case that the low-emission zone is a city center or similar. The solution of the present invention is not only highly effective but, most notably, the present invention may be employed as a cost-effective retrofit solution to guarantee low NOx emissions for diesel vehicles within cities. One way to implement the system and method of the present invention could include installing a wireless receiver in the vehicle and make the appropriate adjustments to the accelerator pedal and the intake temperature sensor (e.g., at the corresponding interfaces to an already conventional control system of the vehicle). Hence, the system of the present invention may be disposed in a time and cost efficient way without any adjustments to the engine and/or catalytic converter systems.

It is understood that the term "vehicle" or "vehicular" or other similar term as used herein is inclusive of motor vehicles in general such as passenger vehicles including sports utility vehicles (SUV), buses, trucks, various commercial vehicles, and the like, and not only may include diesel vehicles but also vehicles running on petrol or other fuels, e.g., hydrogen-powered vehicles and other alternative fuel vehicles (e.g., fuels derived from resources other than petroleum), as well as hybrid vehicles. As referred to herein, a hybrid vehicle is a vehicle that has two or more sources of power, for example both gasoline-powered and electric-powered vehicles.

According to an exemplary embodiment of the present invention, the actual accelerator actuation signals may be reduced to the effective accelerator actuation signals such that the effective accelerator actuation signals stay below an upper engine load limit within the low-emission zone. Hence, an increase of NOx emissions due to a reduction in exhaust gas recirculation by the EGR may be avoided at high engine loads by reducing an accelerator actuation, e.g., a pedal actuation, in an appropriate way. In one example, a maximum torque value may be set, e.g., 120 Nm, which cannot be exceeded independent of the actual accelerator demand. In another example, the accelerator input may be reduced by a certain fixed fraction to an effective accelerator output, for example in dependence on the actual rotation speed, e.g., 50% reduction in accelerator output for rotation speeds between 1000 rpm and 5000 rpm.

According to an exemplary embodiment of the present invention, the actual accelerator actuation signals may be generated by an accelerator pedal of the motor vehicle. In this particular example, the signal from the accelerator pedal may simply be adjusted by providing a corresponding correction element at a pedal encoder between the pedal and a cable harness of the vehicle, which limits the maximum torque/power possible through actuation of the accelerator pedal and/or reduces any pedal actuation signal by a provided amount.

According to an exemplary embodiment of the present invention, the predetermined temperature range may define a lower temperature threshold. Below the lower temperature threshold the actual intake temperature may be increased to the effective intake temperature. The predetermined temperature range may further define an upper temperature threshold. Above the upper temperature threshold the actual intake temperature may be decreased to the effective intake temperature. For example, the intake temperature may be adjusted for environmental temperatures below ca. 10-15° C. and/or above ca. 30° C. The specific amount of the adjustment may depend on various parameters for the specific use case at hand.

According to an exemplary embodiment of the present invention, determining that the motor vehicle drives into the low-emission zone may include receiving an entry signal with a receiving device of the motor vehicle. The entry signal may specify that the motor vehicle has entered the low-emission zone. The control system may thus include a receiving device communicatively coupled with the control device and configured to receive an entry signal configured for specifying that the motor vehicle has entered the low-emission zone. Here, the control device may be configured to determine that the motor vehicle drives into the low-emission zone when the receiving device receives the entry signal. In an exemplary embodiment of the present invention, the receiving device may be a wireless communication unit, which is configured to receive and evaluate signals transmitted by some form of wireless communication, e.g., via dedicated short-range communication or the like. In an example, the system of the present invention may use the same technology as typical toll collection systems.

According to an exemplary embodiment of the present invention, the entry signal may be send by a stationary sending device when the motor vehicle enters the low-emission zone. The stationary sending device may, for example, be disposed at a border to the low-emission zone. The stationary sending device may be configured to send a wireless signal to vehicles passing the border from outside the low-emission zone. Hence, a form of 'Telepass'-like system similar to electronic toll collection systems may be conceived, in which a stationary sender device at the city borders and a mobile receiver on vehicles are combined to secure that diesel vehicles stay below the required emissions levels when entering internal city areas. Reception of a corresponding signal with the receiving device coming from a sending device triggers an appropriate adjustment of the signals from the accelerator pedal actuation and from an intake temperature sensor.

According to an exemplary embodiment of the present invention, the method may further include releasing a confirmation signal by the motor vehicle that the motor vehicle enters the low-emission zone. The vehicle thus may send out an alert notification, on which basis a visual check may be performed if the vehicle has switched into a mode with reduced emissions. In one example, the vehicle may include a communication device, which is configured both as a receiving device and as a sending device configured for receiving/sending out the confirmation signal.

According to an exemplary embodiment of the present invention, the confirmation signal may be a visible signal emitted by a lighting device of the motor vehicle. The lighting device may be a light disposed at the outside of the vehicle, e.g., in the form and/or part of a lamp, for example at the front of the vehicle, at the side mirrors of the vehicle, and the like. In that case, it may be visible from outside the vehicle if the vehicle has switched on the low-emission mode according to an exemplary embodiment of the present invention. Alternatively or additionally, the lighting device may be positioned inside the vehicle, e.g., in a form of a signal light on a control panel like the dashboard or similar. In that case, the vehicle occupants are able to perceive if the low-emission mode has been switched on.

However, in other exemplary embodiments the vehicle may alternatively or additionally emit other signals besides visible signals, e.g., sound signals like beeps and/or automated voice messages. The stationary sending device may be positioned at or close to the border of the low-emission zone within the city center. Similar to toll systems, the stationary sending device may be accompanied by corresponding lane signs and/or road markings, so that a vehicle operator may recognize the border to a low-emission zone.

According to an exemplary embodiment of the present invention, the low-emission zone may correspond to an internal city area.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
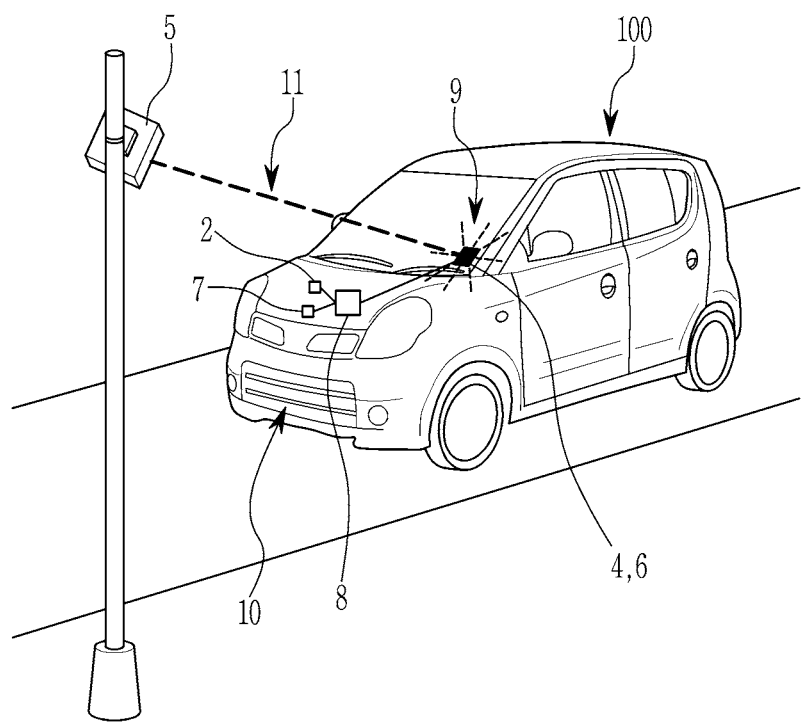
FIG. 1 schematically depicts a motor vehicle with a control system for controlling exhaust gas emission according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 8:
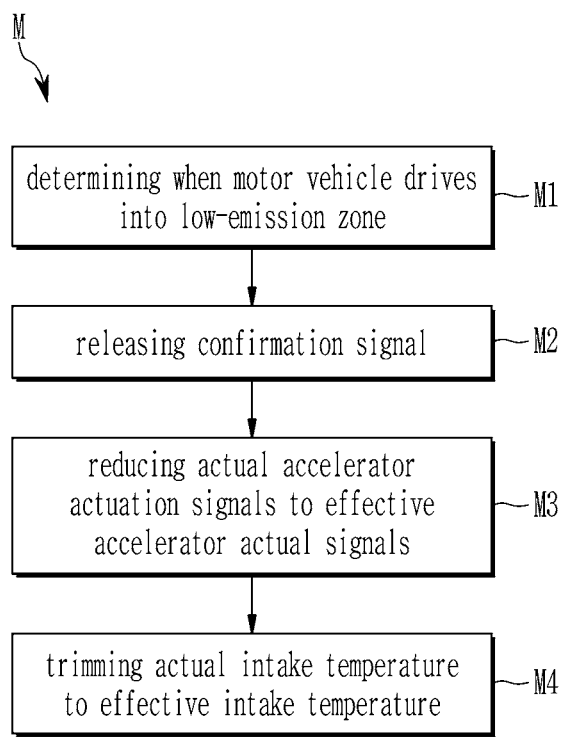
FIG. 8 shows a flow diagram of a method for controlling exhaust gas emission with the control system of FIG. 1.

FIG. 1 schematically depicts a motor vehicle 100 with a control system 10 for controlling exhaust gas emission according to an exemplary embodiment of the present invention. A corresponding flow diagram of a method M for controlling exhaust gas emission with the control system 10 of FIG. 1 is shown in FIG. 8. The system 10 and method M are used in the present example to regulate emissions of diesel vehicles within city areas to reduce emissions and avoid banning of these or similar vehicles from the city area. The motor vehicle 100 of the present exemplary embodiment of the present invention is configured with an internal combustion engine running on diesel fuel.

Figure 7:
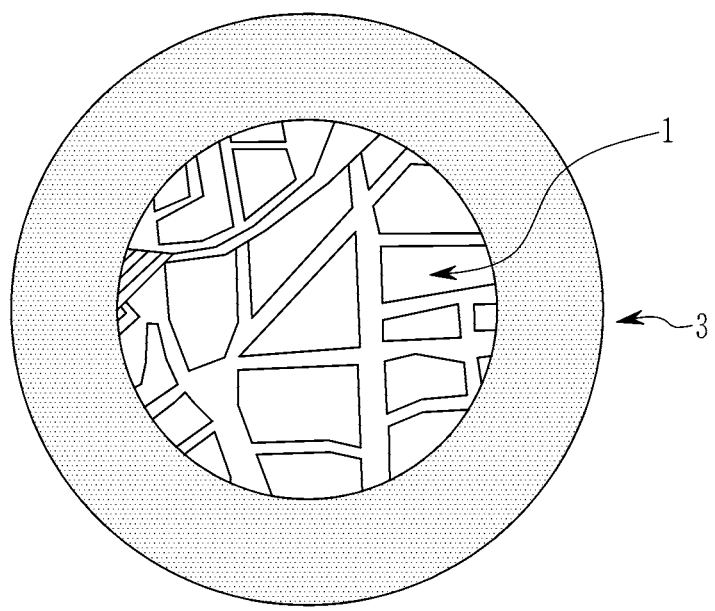
FIG. 7 shows a low emission zone within a city, in which the control system of FIG. 1 is used to reduce exhaust emissions.

FIG. 7 shows an exemplary city 3, which has an internal city area which is marked as a low-emission zone 1, in which certain regulations apply with respect to emission levels. For example, an upper limit on NOx emissions may be defined for the present low-emission zone 1 so that only those vehicles may enter the internal city that are able to regulate their emissions below the present level while traveling through the city 3.

Coming back to FIG. 1, the control system 10 is regulated by a control device 8 disposed in the vehicle 100 and connected on the one side to an exhaust gas recirculation (EGR) subsystem 2 and an intake temperature sensor 7 of the vehicle 100. On the other side, the control device 8 is connected to a receiving device 4, which is provided with a lighting device 6. The control system 8 is further connected to an accelerator pedal of the vehicle 100, which is not shown in FIG. 1.

The intake temperature sensor 7 is configured to measure an actual intake temperature Ta of the motor vehicle 100, which is then used by the control system 8 as an input to the exhaust emission control, for controlling operation of the EGR subsystem 2. The control system 8 further receives actual acceleration actuation signals A from the accelerator pedal, which define current acceleration demands by an operator of the vehicle 100. Both, the accelerator signals and the temperature signals are used by the control system 8 as inputs for controlling the EGR subsystem 2. However, contrary to conventional systems, the actual acceleration actuation signals Aa as well as the actual intake temperature Ta are first adjusted to improve the effectivity of the EGR subsystem 2 before these are forwarded for EGR control.

Normally, the volume of air recirculated by the EGR subsystem 2 through the engine is regulated depending on the actual intake temperature Ta as well as the actual accelerator actuation signals Aa. For example, at high engine loads and/or high torques, the volume of air transferred by the EGR subsystem 2 is decreased. Similarly, the EGR performance is phased down for temperatures outside an optimal working range, typically between 15° C. to 30° C. Hence, for high engine loads (corresponding to large accelerator requests) and at low/high intake temperatures, there may be a significant increase in NOx emissions due to a reduction in capacity of the EGR subsystem 2 or because this system is switched off completely. Hence, a diesel vehicle may emit NOx on a level not allowed within the low-emission zone 1.

To avoid the present problem, the control device 8 of the exemplary embodiment of the present invention is configured to determine when the motor vehicle 100 drives into the low-emission zone 1. To the present end, the receiving device 4 is communicatively coupled with the control device 8 and configured to receive an entry signal 11 specifying that the motor vehicle 100 has entered the low-emission zone 1. The control device 8 on the other hand is configured to determine that the motor vehicle 100 drives into the low-emission zone 1 when the receiving device 4 receives the entry signal 11. The entry signal 11, which may be an infrared signal, a radio signal or other wireless signal, is released by a stationary sending device 5, which is disposed at a border of the low-emission zone 1, e.g., adjacent to or above a road, e.g., in a similar vein as toll collection systems. The vehicle 100 further includes a lighting device 6 being configured to emit a visible (or other) confirmation signal 9 when the motor vehicle 100 enters the low-emission zone 1 so that the stationary sending device 5 and/or a person may check that the vehicle 100 has recognized that it is entering the low-emission zone 1 and will initiate appropriate steps to stay below the required emission levels, as will be explained in the following.

The control device 8 is configured to reduce the actual accelerator actuation signals Aa of the motor vehicle 100 to effective accelerator actuation signals Ae within the low-emission zone 1, to trim the actual intake temperature Ta of the motor vehicle 100 to an effective intake temperature Te when the actual intake temperature Ta falls outside a predetermined temperature range within the low-emission zone 1, and to control the EGR subsystem 2 based on the effective accelerator signals Ae and the effective intake temperature Te as inputs thereof. Hence, these adjusted effective values are used to steer the EGR subsystem 2 and not the actual values as in conventional systems.

The actual accelerator actuation signals Aa are reduced to the effective accelerator actuation signals Ae such that the effective accelerator actuation signals Ae stay below an upper engine load limit within the low-emission zone 1 to avoid a reduction in EGR performance for high engine loads and/or torques. Furthermore, the predetermined temperature range defines a lower temperature threshold T1 below which the actual intake temperature Ta is increased to the effective intake temperature Te and/or an upper temperature threshold T2 above which the actual intake temperature Ta is decreased to the effective intake temperature Te. Hence, in a similar vein also the intake temperature is readjusted to avoid losing performance of the EGR subsystem 2 when driving under temperatures above or below the normal operating temperatures of the EGR subsystem 2.

The method M in FIG. 8 correspondingly includes under M1 determining when the motor vehicle 100 drives into the low-emission zone 1. The method M further includes under M2 releasing the confirmation signal 9 by the motor vehicle 100 that the motor vehicle 100 enters the low-emission zone 1. The method M further includes under M3 reducing the actual accelerator actuation signals Aa of the motor vehicle 100 to the effective accelerator actuation signals Ae within the low-emission zone 1. The method M further includes under M4 trimming the actual intake temperature Ta of the motor vehicle 100 to the effective intake temperature Te when the actual intake temperature Ta falls outside the predetermined temperature range within the low-emission zone 1. The method M then utilizes the effective accelerator actuation signals Ae and the effective intake temperature Te as inputs to controlling the EGR subsystem 2.

Illustrative examples for the above approach are explained with reference to FIGS. 2 to 6.

Figure 2:
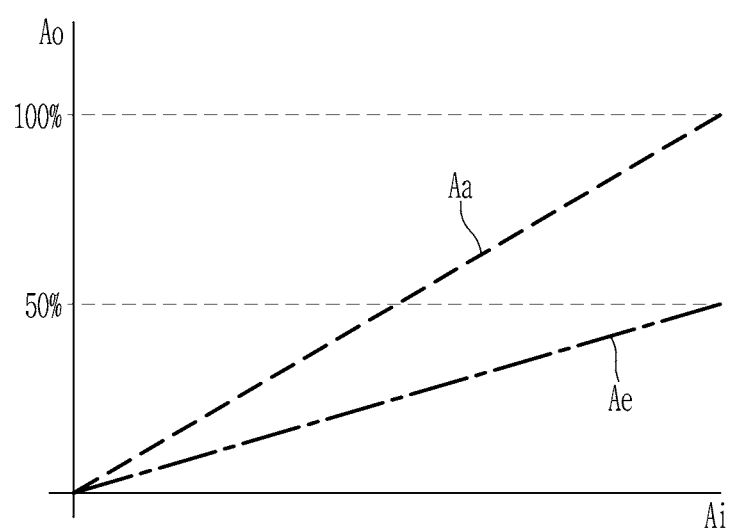
FIG. 2 shows a schematic plot illustrating usage of the control system of FIG. 1.

In the example of FIG. 2, an accelerator OUT signal Ao is shown versus an accelerator IN signal Ai. An actual accelerator actuation signal Aa is shown next to an effective accelerator actuation signal Ae. There is a one-to-one correspondence between accelerator IN signal Ai and accelerator OUT signal Ao in a case of the actual accelerator actuation signal Aa. However, as may be seen, the effective accelerator actuation signal Ae is reduced by a fraction of 50% with respect to the actual accelerator actuation signal Aa over the whole input range. Hence, the engine of the vehicle 100 is effectively operated at a reduced performance within the low-emission zone 1 and, thus, emission levels are kept low. It is understood that the shown values are merely an example. The person of skill will readily contemplate how to reduce the actual accelerator actuation signal Aa to the effective accelerator actuation signal Ae for each application.

Figure 3:
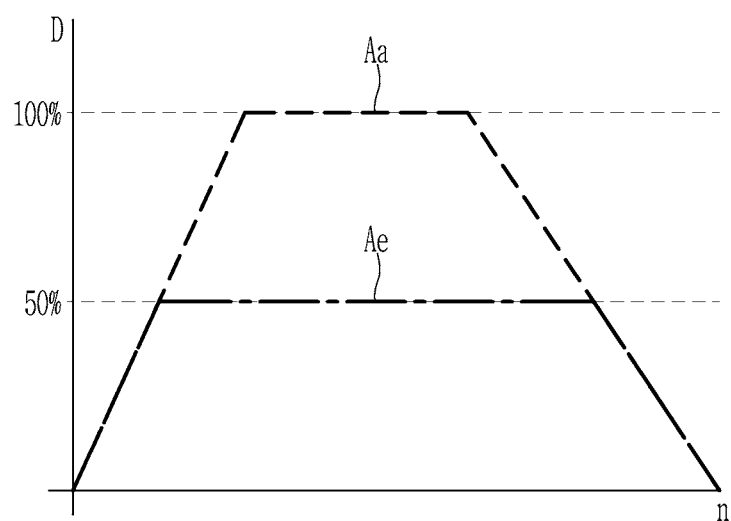
FIG. 3 shows another schematic plot illustrating usage of the control system of FIG. 1.

As an exemplary embodiment of the present invention, FIG. 3 shows torque D as a function of rotation speed n for an actual accelerator actuation signal A and a reduced effective accelerator actuation signal Ae, wherein the reduced effective accelerator actuation signal Ae is limited to 50% of the maximum torque D.

Figure 4:
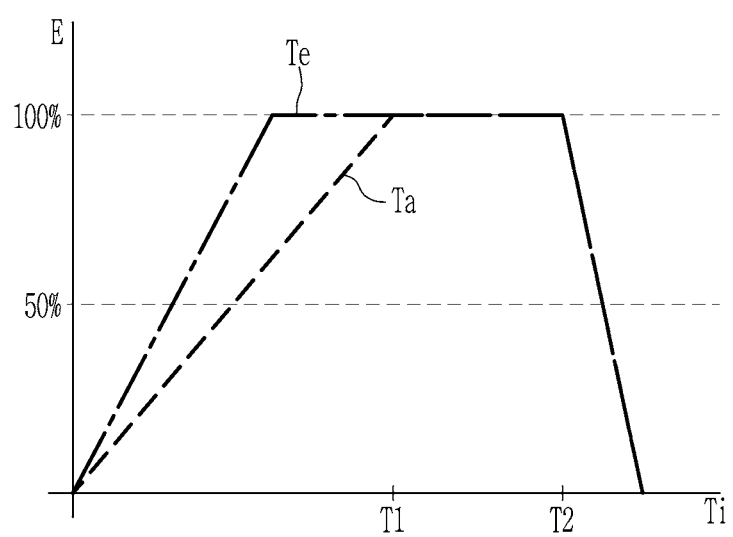
FIG. 4 shows yet another schematic plot illustrating usage of the control system of FIG. 1.

In a similar vein, FIG. 4 illustrates EGR operation level versus an intake temperature IN signal for an actual intake temperature Ta and an effective intake temperature Te. An upper temperature threshold T2, e.g., 30° C., and a lower temperature threshold T1, e.g., 20° C., are defined. As may be seen, the effective intake temperature Te is increased with respect to the actual intake temperature Ta below the lower temperature threshold T1 such that the EGR subsystem 2 runs on full capacity even below the lower temperature threshold T1, at least for some temperature range, e.g., down to 10° C. or less. In a similar vein, the effective intake temperature Te could be increased above the upper temperature threshold T2 (in the present example however both actual and effective intake temperatures are equal above the upper threshold T2).

Figure 5:
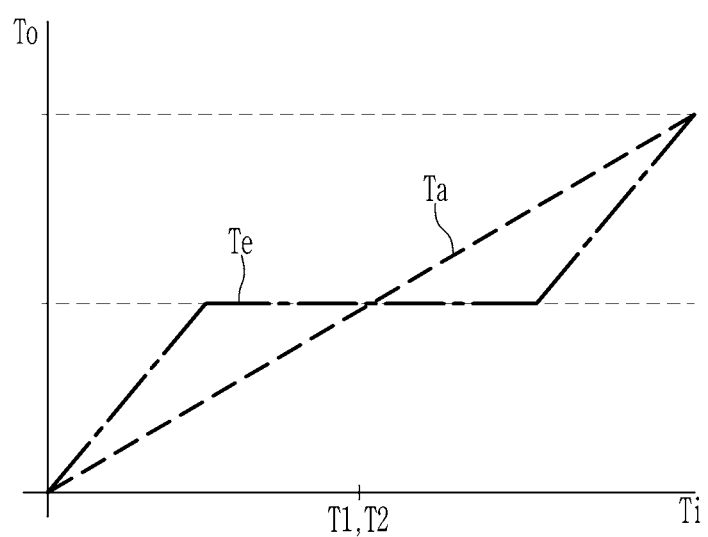
FIG. 5 shows another schematic plot illustrating usage of the control system of FIG. 1.

FIG. 5 shows another example, in which an intake temperature OUT signal is shown versus an intake temperature IN signal for both actual intake temperature Ta and effective intake temperature Te. As may be seen, the actual intake temperature Ta is decreased above an upper temperature threshold T2 and increased below a lower temperature threshold T1, wherein both thresholds T1, T2 are equal in the present specific example. Based on such an adjustment, the EGR operation region may be increased to a larger operating range.

Figure 6:
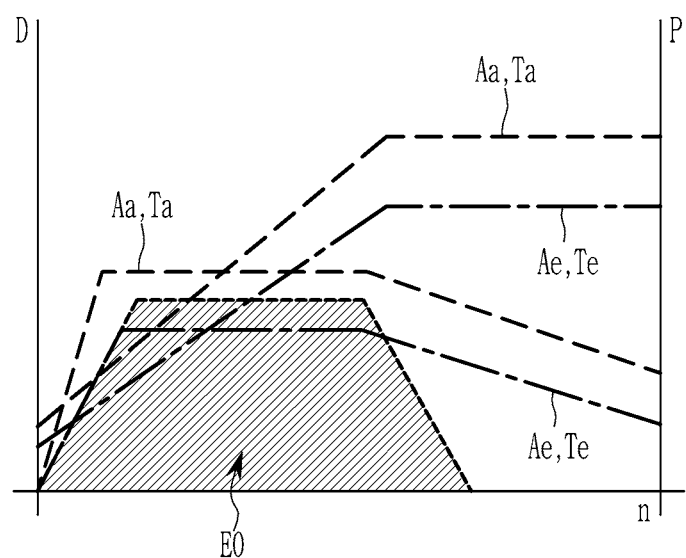
FIG. 6 shows yet another schematic plot illustrating usage of the control system of FIG. 1.

This is also demonstrated in FIG. 6, which shows torque D as well as engine power P as a function of rotation speed n for the actual values (control system off) and the effective values (control system on) of accelerator actuation signals Aa, Ae and intake temperatures Ta, Te. As may be seen, the vehicle 100 is operated at consistently lower torque D as well as engine power P in case that the present control system 10 is switched on. As a consequence, the vehicle 100 may be operated for a larger region of the parameter space within the EGR operating region E0 where the EGR subsystem 2 is switched on and/or running at full/high capacity (cf. The hatched EGR operating region E0 in FIG. 6).

As a result, the control system 10 may be used to limit engine emissions without any modification to the engine itself. Instead, merely acceleration actuation and intake temperatures are adjusted to be configured to use the EGR subsystem 2 more effectively within the internal city. To this end, engine performance is deliberately reduced. The control system 10 described above may be easily retrofitted to existing vehicles by simply providing a receiving/lighting device 4, 6 (e.g., a wireless device with signal light) together with an appropriate modification at the accelerator pedal and the intake temperature sensor. The described solution thus provides an effective and cost-efficient way to reduce emissions for diesel vehicles within the city.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling exhaust gas emission of a vehicle, the method comprising:
   determining, by a controller, when the vehicle drives into a low-emission zone, wherein the low-emission zone is a zone limiting a maximum emission level for vehicles;
   reducing, by the controller, actual accelerator actuation signals of the vehicle to effective actual accelerator actuation signals within the low-emission zone; and
   trimming, by the controller, an actual intake temperature of the vehicle, being measured with an intake temperature sensor of the vehicle, to an effective intake temperature when the actual intake temperature falls outside a predetermined temperature range within the low-emission zone,
   wherein at least one of the effective actual accelerator actuation signals and the effective intake temperature are used as inputs for controlling an exhaust gas recirculation (EGR) subsystem of the vehicle.

2. The method according to claim 1,
   wherein the actual accelerator actuation signals are reduced to the effective actual accelerator actuation signals such that the effective actual accelerator actuation signals stay below an engine load limit within the low-emission zone.

3. The method according to claim 1,
   wherein the actual accelerator actuation signals are generated by an accelerator pedal of the vehicle.

4. The method according to the claim 1,
   wherein the predetermined temperature range defines a first temperature threshold below which the actual intake temperature is increased to the effective intake temperature and/or a second temperature threshold above which the actual intake temperature is decreased to the effective intake temperature.

5. The method according to the claim 1,
   wherein the determining when the vehicle drives into the low-emission zone includes receiving an entry signal with a receiving device of the vehicle, and
   wherein the entry signal is configured to specify that the vehicle has entered the low-emission zone.

6. The method according claim 5,
   wherein the entry signal is sent by a stationary sending device when the vehicle enters the low-emission zone.

7. The method according to the claim 1, further including:
   releasing, by the controller, a confirmation signal by the vehicle that the vehicle enters the low-emission zone when the vehicle drives into the low-emission zone.

8. The method according to claim 7,
   wherein the confirmation signal is a visible signal emitted by a lighting device of the vehicle.

9. The method according to the claim 1, wherein the low-emission zone corresponds to an internal city area.

10. A control system for controlling exhaust gas emission of a vehicle, the control system including:
    an exhaust gas recirculation (EGR) subsystem;
    an intake temperature sensor configured to measure an intake temperature of the vehicle; and
    a controller,
    wherein the controller is configured to determine when the vehicle drives into a low-emission zone, the low-emission zone being a zone limiting a maximum emission level for vehicles,
    wherein the controller is configured to reduce actual accelerator actuation signals of the vehicle to effective actual accelerator actuation signals within the low-emission zone,
    wherein the controller is configured to trim an actual intake temperature of the vehicle measured with the intake temperature sensor to an effective intake temperature when the actual intake temperature falls outside a predetermined temperature range within the low-emission zone, and
    wherein the controller is configured to control the EGR subsystem based on at least one of the effective actual accelerator actuation signals and the effective intake temperature as inputs thereof.

11. The control system according to claim 10, further including:
    a receiving device communicatively coupled with the controller and configured to receive an entry signal configured for specifying that the vehicle has entered the low-emission zone,
    wherein the controller is configured to determine that the vehicle drives into the low-emission zone when the receiving device receives the entry signal.

12. The control system according to claim 10, further including:
    a lighting device configured to emit a confirmation signal when the vehicle enters the low-emission zone.

13. The control system according to the claim 10,
    wherein the controller is configured to reduce the actual accelerator actuation signals to the effective actual accelerator actuation signals such that the effective actual accelerator actuation signals stays below an engine load limit within the low-emission zone.

14. The control system according to the claim 10,
    wherein the predetermined temperature range defines a first temperature threshold below which the actual intake temperature is increased to the effective intake temperature by the controller and a second temperature threshold above which the actual intake temperature is decreased to the effective intake temperature by the controller.

15. The vehicle with the control system according to the claim 10.

* * * * *